United States Patent [19]

Yoshikawa et al.

[11] Patent Number: 4,651,696
[45] Date of Patent: Mar. 24, 1987

[54] FOUR-STROKE INTERNAL COMBUSTION ENGINE

[75] Inventors: Masaaki Yoshikawa, Iwata; Kazuo Aoi, Hamamatsu, both of Japan

[73] Assignee: Yamaha Hatsudoki Kabushiki Kaisha, Iwata, Japan

[21] Appl. No.: 755,917

[22] Filed: Jul. 17, 1985

[30] Foreign Application Priority Data

Aug. 16, 1984 [JP] Japan .................................. 59-169901

[51] Int. Cl.⁴ ............................................ F02B 75/02
[52] U.S. Cl. .................................... 123/308; 123/315; 123/432
[58] Field of Search ............... 123/306, 308, 315, 432, 123/193 H, 193 R, 193 P

[56] References Cited

U.S. PATENT DOCUMENTS 3,416,502 12/1968 Weiss .................................. 123/432
4,363,300 12/1982 Honda ................................. 123/315

FOREIGN PATENT DOCUMENTS

| 183527 | 11/1982 | Japan | 123/315 |
| 183553 | 11/1982 | Japan | 123/315 |
| 23220 | 2/1983 | Japan | 123/432 |
| 47109 | 3/1983 | Japan | 123/315 |
| 687528 | 2/1953 | United Kingdom | 123/315 |

Primary Examiner—Craig R. Feinberg
Attorney, Agent, or Firm—Ernest A. Beutler

[57] ABSTRACT

A combustion chamber configuration for an engine having three intake valves and two exhaust valves per cylinder. The combustion chamber configuration permits the use of stroke-to-bore ratios of 0.8 to 1 or less and compression ratios of 9 to 1 or greater while affording good flame travel in the combustion chamber. The piston is formed with a generally flat head that has semi-circular recesses for valve clearance.

12 Claims, 6 Drawing Figures

4,651,696

FOUR-STROKE INTERNAL COMBUSTION ENGINE

BACKGROUND OF THE INVENTION

This invention relates to a four-stroke internal combustion engine and more particularly to an improved combustion chamber configuration for such engines.

In engine design, it is a well known practice to employ a stroke-to-bore ratio that is less than unity so that the bore is greater than the stroke of the engine. Such arrangements have a number of advantages. For example, such stroke-to-bore ratios provide large surface areas for a given engine displacement and permit the use of higher engine speeds. Because of the large surface area, it is possible to provide a greater valve area with engines having stroke-to-bore ratios less than unity.

In order to still further improve the valve area and to permit greater increases in engine speed, it has been the practice to employ multiple intake and/or exhaust valves for each combustion chamber. In addition to providing a stroke-to-bore ratio less than unity and preferably in the range of 0.8 or less, it is also desirable to provide a relatively high compression ratio for the engine. High compression ratios result in better engine performance both in the form of power output and fuel economy. It is desirable if the compression ratio can be maintained at 9 to 1 or more. However, the use of large valve areas makes it difficult, with conventional engine constructions, to maintain such high compression ratios.

The reason for this is that the lift of the valve should be related to its diameter and the larger the diameter the larger the lift to achieve good flow characteristics. However, in order to provide adequate clearance for such high valve lifts with large valves, it is necessary to dome the head of the piston and form recesses to clear the valves. This results in a combustion chamber that is long and narrow. If a single, centrally positioned spark plug is employed, such combustion chamber configurations require very long flame travel and it is difficult to insure complete combustion with such combustion chambers.

The effects of this may be seen in FIG. 1 of the drawings which is a cross-sectional view taken through the axis of a cylinder of an engine having a prior art construction. In this figure, a cylinder block is identified by the reference numeral 11 and has a cylinder bore 12 in which a piston 13 is supported for reciprocation. A cylinder head 14 is affixed to the cylinder block 11 and one or more intake valves 15 and exhaust valves 16 are carried by the cylinder head 14 and control the communication of intake and exhaust ports (not shown) with a combustion chamber 17 that is formed between the head of the piston 13, the cylinder bore 11 and the corresponding recess of the cylinder head 14. A spark plug 18 is provided with its gap positioned centrally of the combustion chamber 17.

As may be seen, the piston 13 is provided with a domed central portion in which recesses 19 and 21 are formed so as to clear the heads of the valves 15 and 16 and provide adequate clearance for their full lift. If a compression ratio of 9 to 1 or greater is to be employed with an engine of this type having a stroke-to-bore ratio of 0.8 to 1 or less, the combustion chamber will be long and narrow. Thus, it is difficult to insure complete combustion using only a single centrally positioned spark plug. In addition, this configuration of combustion chamber is prone to a condition known as "knocking".

It is, therefore, a principal object of this invention to provide an improved combustion chamber configuration for an internal combustion engine.

It is a further object of this invention to provide an improved combustion chamber configuration for an engine having a stroke-to-bore ratio of 0.8 to 1 or less and a compression ratio of 9 to 1 or greater.

It is a yet further object of this invention to provide a combustion chamber configuration that will provide good running, high outputs and good fuel economy through the use of a single centrally positioned spark plug and multiple valves.

SUMMARY OF THE INVENTION

This invention is adapted to be embodied in a combustion chamber configuration for an internal combustion engine having a cylinder with a cylinder bore, a piston having a piston head supported for reciprocation in the cylinder bore and a cylinder head fixed relative to the cylinder block and defining a combustion chamber with the piston head and cylinder bore. A plurality of intake and exhaust valves are provided in the cylinder head for communicating with the combustion chamber and there are at least three of one of the valves. The center of the head of the piston is formed to extend upwardly relative to the cylinder bore no more than the outer peripheral edge of the piston head.

DETAILED DESCRIPTION OF THE PREFERRED EMBODIMENT

Figure 5:
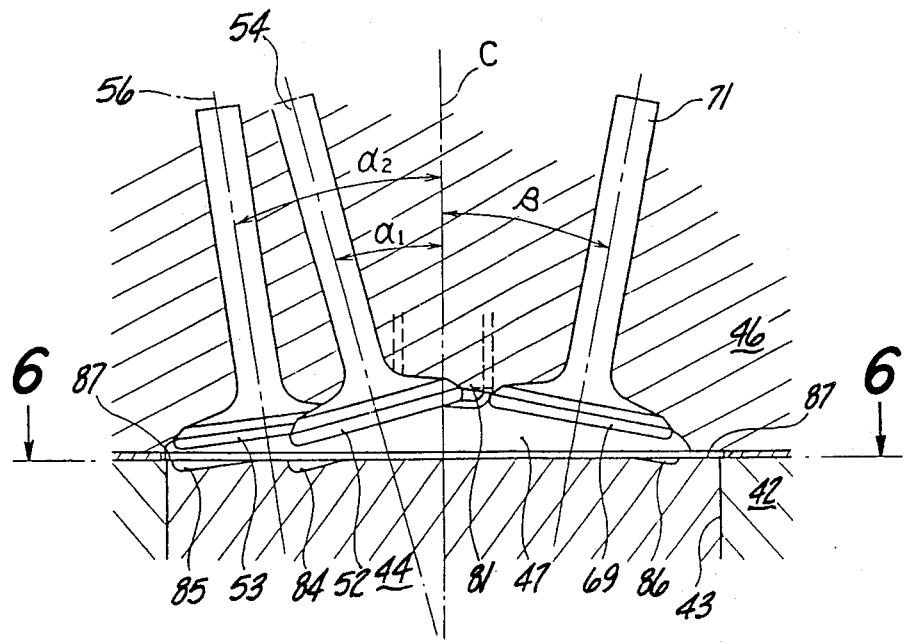
FIG. 5 is a cross-sectional view, in part similar to FIG. 1, showing the combustion chamber configuration in this embodiment.

The reference numeral 41 indicates generally a four-cycle internal combustion engine constructed in accordance with a first embodiment of the invention. Since the invention is directed primarily toward the valve train and combustion chamber configuration, only this portion of the engine has been illustrated in detail and, for the same reason, only the construction associated with one of the cylinders will be described.

The engine includes a cylinder block 42 that is formed with cylinder bores 43. Pistons 44 are supported for reciprocation in the cylinder bores 43 and drive the crankshaft (not shown) in a known manner via a connecting rod 45. A cylinder head 46 is affixed to the cylinder block 42 in a known manner. The cylinder head 46 is formed with individual cavities 47 that cooperate with the cylinder bores 43 and pistons 44. At times, the cavities 47 will be referred to as the combustion chamber.

The cylinder head 46 is formed with intake passages that communicate with each combustion chamber 47. The intake passages consist of pairs of first intake passages 48 that extend through an intake side of the cylinder head 46 and which terminate at respective intake ports. Between the intake passages 48, the cylinder head 46 is formed with a third intake passage 49 for each combustion chamber 47. The intake passage 49 also terminates at an intake port. As will be described, the intake port associated with the passage 49 is disposed between the ports formed by the passages 48 and is disposed outwardly of a plane C that contains the axis of the cylinder bore 43.

The intake passages 48 and 49 may have individual openings in the outer surface of the cylinder head or, as in the illustrated embodiment, the passages 48 and 49 may merge into a common inlet opening 51 that is adapted to be fed with a fuel/air charge from any suitable charge former such as a carburetor or fuel injection nozzle and intake manifold (not shown).

Figure 4:
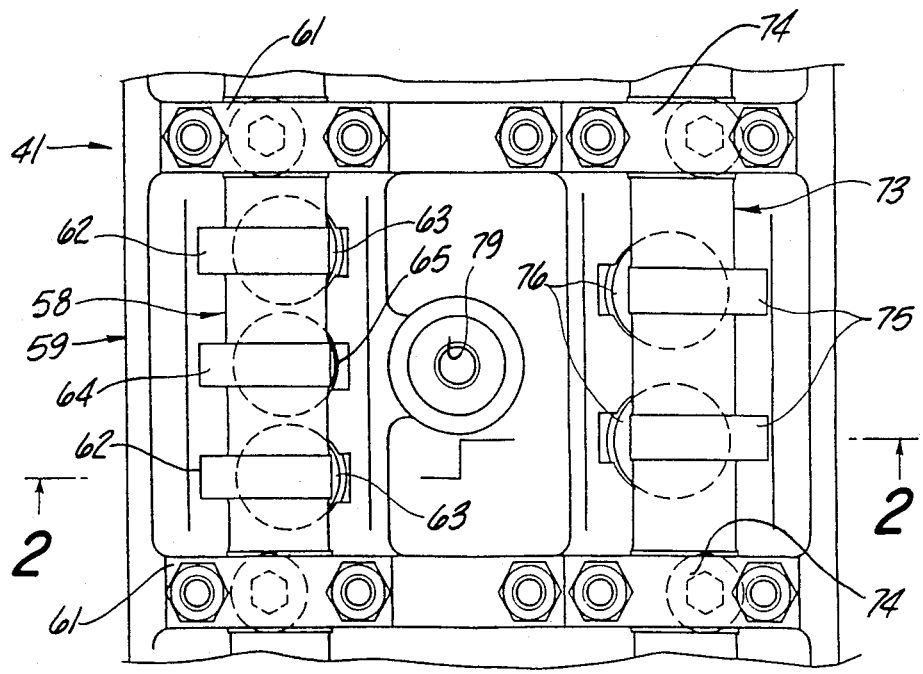
FIG. 4 is a top plan view looking in the direction of the arrow 4 in FIG. 2.

Intake valves 52 cooperate with valve seats formed in the intake ports associated with the intake passages 48 so as to control the flow of intake charge into the combustion chamber 47. An intake valve 53 cooperates with a valve seat formed at the intake port associated with the intake passage 49. The intake valves 52 reciprocate along respective parallel axes, indicated by the line 54 (FIGS. 4 and 5). The intake valves 52 are supported for reciprocation along the axes 54 by valve guides 55 that are pressed into the cylinder head 46. The intake valve 53 for each cylinder 43 reciprocates along an axis 56 (FIGS. 2 and 5) as defined by a valve guide 57 that is also pressed into the cylinder head 46. The axis 56 is not parallel to the axis 54 for a reason to be described.

The axes 54 and 56 all intersect the axis of rotation $0_1$ of an intake camshaft, indicated generally by the reference numeral 58. The intake camshaft 58 is supported for rotation in a cam tower 59 that is affixed to the cylinder head 46 in a known manner. Bearing caps 61 are affixed at spaced locations to the cam tower 59 and cooperate with the cam tower to journal the intake camshaft 58. Because the intake valve axes 54 and 56 intersect the axis of rotation $0_1$ of the camshaft 58, it is possible to directly operate each of the intake valves 52 and 53. The camshaft 58 is provided with a first pair of lobes 62 that engage tappet followers 63 that are reciprocally supported in the valve tower 59 and which contact the stems of the intake valves 52 for their direct actuation. The camshaft 58 is also provided with a lobe 64 between the lobes 62 which cooperates with a tappet follower 65 for directly actuating the intake valve 53.

Valve springs 66 encircle each of the intake valves 52 and 53 and act against keeper spring retainer assemblies 67 for urging the valves 52 and 53 to their closed positions.

Figure 2:
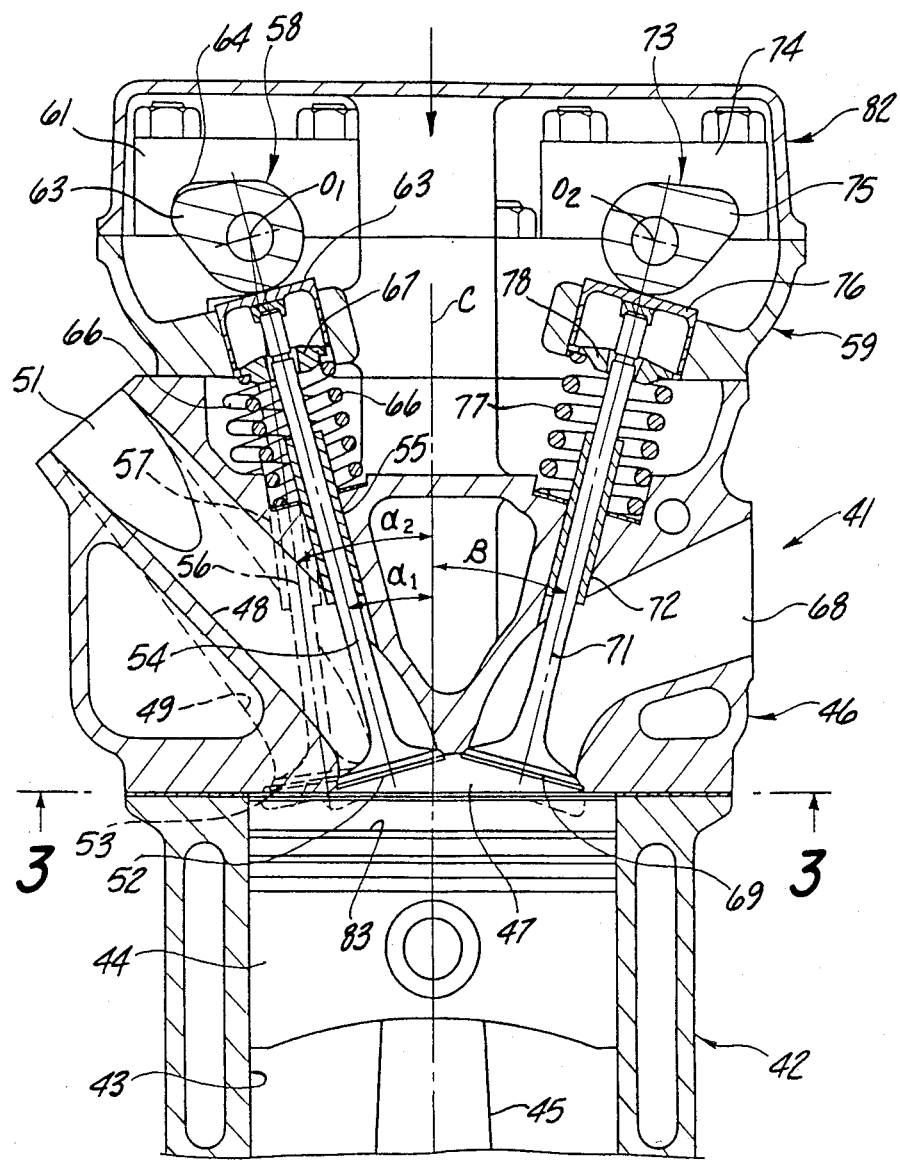
FIG. 2 is a cross-sectional view taken through a cylinder of an internal combustion engine constructed in accordance with an embodiment of the invention taken along line 2—2 of FIG. 4.
Figure 3:
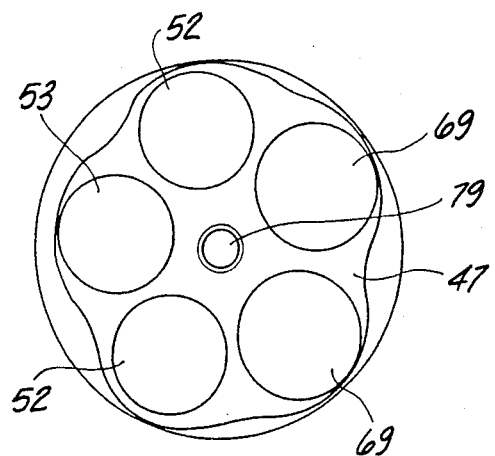
FIG. 3 is a view taken in the direction of the line 3—3 in FIG. 2 and shows the combustion chamber configuration of the cylinder head.

The reciprocal axes 54 of the intake valves 52 lie at an angle $\alpha_1$ to the plane C (FIGS. 2 and 5). The axis 56 of the intake valve 53 lies at an angle $\alpha_2$ to the plane 18. The angle $\alpha_1$ is less than the angle $\alpha_2$. That is, the axes 54 of the intake valves 52 are at a lesser angle to the cylinder bore axis than is the axis 56 associated with the intake valve 53. As a result, the intake valve 53 is spaced radially outwardly from the plane C toward the peripheral edge of the cylinder bore 43, as clearly shown in FIG. 2. This arrangement permits the three intake valves 52, 53 all to reciprocate between their open and closed positions without interference with each other, while at the same time maximizing intake valve area. Due to this different angle relative to the camshaft rotational axis $0_1$, the cam lobe 64 is advanced relative to the cam lobes 63 so that all intake valves 52 and 53 will be operated simultaneously. Of course, if desired, a different valve timing might be employed. Since the axes 54 and 56 all intersect the camshaft axis $0_1$, it is possible to operate more than two intake valves from the same camshaft.

Exhaust passages 68 extend through the side of the cylinder head 46 opposite to the intake passages 48 and 49. There are a pair of exhaust passages 68 associated with each cylinder bore 43 in connection with the illustrated embodiment. The exhaust passages 68 terminate in exhaust ports and valve seats. Exhaust valves 69 cooperate with the valve seats and exhaust ports for controlling the communication of the combustion chamber 47 with the exhaust passages 68. The exhaust valves 69 are supported for reciprocation about respective axes 71 by means of valve guides 72 that are pressed into the cylinder head 46. The exhaust valve axes 71 lie at angle $\beta$ to the plane C. The angle $\beta$ is greater than the angle $\alpha_2$ of the intake valve 53 but less than the angle $\alpha_1$ of the intake valves 52.

The exhaust valve axes 71 intersect the axis of rotation $0_2$ of an exhaust camshaft 73. The exhaust camshaft 73 is rotatably journaled in the cam tower 59 and is journaled by the cam tower 59 and bearing caps 74 that are affixed in a known manner to the cam tower 59. Because the axes 71 intersect the exhaust cam axes $0_2$, it is possible to directly actuate the exhaust valves 69. For this purpose, the exhaust camshaft 73 is provided with lobes 75 that engage tappet followers 76 which, in turn, directly actuate the exhaust valves 69.

Valve springs 77 encircle the exhaust valves 69 and engage keeper spring retainer assemblies 78 for urging the exhaust valves 69 to their closed position.

As may be readily seen from FIGS. 2 and 5, the centers of the exhaust valves 69 lie on a plane that is offset from the plane C on the side opposite the intake valves 52 and 53.

A threaded spark plug opening 79 is formed in the cylinder head 46 on the plane C and at the center of the respective cylinder bore 43. A spark plug is threaded into this opening and has its gap 81 in the center of the combustion chamber 47.

A camshaft cover 82 is affixed in any suitable manner to the cam tower 59 so as to enclose the camshafts 58 and 73. The cover 82 is formed with openings that are aligned with the spark plug openings 79 to permit insertion and removal of the spark plugs.

The engine 42 is designed so that its stroke-to-bore ratio is 0.8 or less and its compression ratio is 9 to 1 or higher. This is accomplished by the specific placement of the valves 52, 53 and 69 and the configuration of the head of the piston 44, now to be described.

Figure 1:
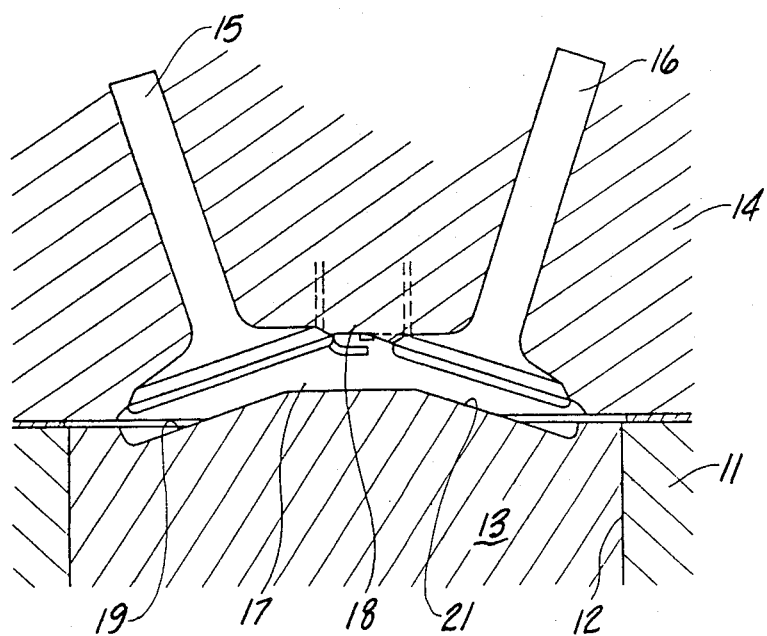
FIG. 1 is a cross-sectional view, taken through the center of a cylinder of an internal combustion engine having a conventional prior art combustion chamber configuration.
Figure 6:
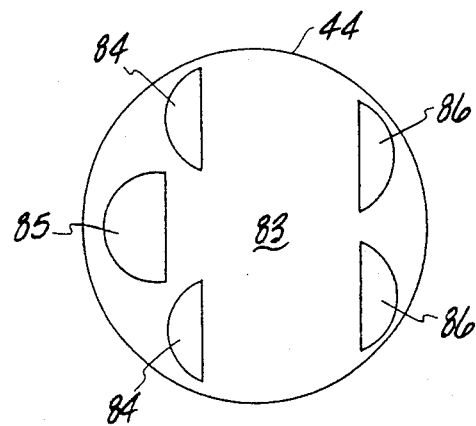
FIG. 6 is a top plan view showing the configuration of the head of the piston.

The head of the piston 44 is identified generally by the reference numeral 83 and, as may be seen in FIGS. 2, 5 and 6, it is generally planar in configuration. Because of this generally planar configuration and the specific configuration of the cylinder head cavity 47, the combustion chamber has a configuration such that the largest volume of the combustion chamber is immediately adjacent the spark plug gap 81 and the volume or cross-sectional area decreases progressively toward the outer periphery of the piston head 83. This is sharply contrasted with the configuraton of the conventional prior art combustion chamber configuration as shown in FIG. 1. As a result of this configuration, the flame travel will be good in the combustion chamber 47 and complete combustion will be insured. In addition, the likelihood of knocking is significantly reduced.

For the reasons, already noted, it is desirable to maintain a relatively high lift for each of the valves 52, 53 and 69. This is possible by providing the head 83 of the piston 44 with respective recesses so as to clear the valves. These recesses comprise a pair of first recesses 84 for the intake valves 52 which recesses are part circular in configuration and which extend very shallowly into the piston head 83. A further recess 85 is formed in the head 83 between the recesses 84 and outwardly from the plane C. The recess 85 encompasses a larger segment of a circle of the same diameter as the recesses 84. This is because the valve 53, which the recess 85 accommodates, is positioned at a shallower angle to the plane C than the valves 52 and their corresponding recesses 84.

On the opposite side of the plane C from the recesses 84 and 85, a pair of part circular recesses 86 are formed to accommodate the heads of the exhaust valves 69. The recesses 84, 85 and 86 are also surrounded by a flat area 87 of the piston head that is adjacent the ring groove and on the outer periphery of the piston head 83. The center of the piston head area 83 does not extend above the flattened section 87 and, in fact, lies in the same plane with it as clearly shown in FIG. 5. This results in the aforenoted desirable combustion chamber configuration.

Although an embodiment of the invention has been illustrated and described which embodiment achieves the aforenoted objects, various changes and modifications may be made without departing from the spirit and scope of the invention, as defined by the appended claims.

We claim:

1. A combination chamber configuration for an internal combustion engine having a cylinder with a cylinder bore, a piston having a piston head supported for reciprocation in said cylinder bore, a cylinder head fixed relative to said cylinder and defining a combustion chamber with said piston head and said cylinder bore, a plurality of poppet type intake valves numbering only three in said cylinder head communicating with said combustion chamber, and a plurality of poppet type exhaust valves numbering at least two in said cylinder head communicating with said combustion chamber, each valve having a head and a stem, the center of the head of said piston being formed to extend upwardly in said cylinder bore no more than an outer peripheral edge of said piston head, wherein the heads of the intake valves all lie substantially on one side of a plane containing the cylinder bore axis and the heads of the exhaust valves lie on the other side of the plane, having two of the intake valves reciprocate about parallel axes that are disposed at a first angle to said one side of the plane and the remaining intake valve is reciprocal about an axis that extends at a second angle to said one side of the plane, the second angle being less than the first angle, and said plurality of said exhaust valves reciprocate at an angle to the other side of said plane having a degree less than that of said first angle and being inclined to the plane.

2. A combustion chamber configuration as set forth in claim 1 wherein the engine has a compression ratio of at least 9 to 1.

3. A combustion chamber configuration as set forth in claim 1 wherein the engine has a stroke-to-bore ratio of at most 0.8 to 1.

4. A combustion chamber configuration as set forth in claim 3 wherein the engine has a compression ratio of at least 9 to 1.

5. A combustion chamber configuration as set forth in claim 1 wherein the piston head is formed with recesses to clear the heads of the valves.

6. A combustion chamber configuration as set forth in claim 5 wherein the piston head is generally planar except for the recesses.

7. A combustion chamber configuration as set forth in claim 6 wherein the engine has a stroke-to-bore ratio of at most 0.8 to 1.

8. A combustion chamber configuration as set forth in claim 7 wherein the engine has a compression ratio of at least 9 to 1.

9. A combustion chamber configuration as set forth in claim 1 wherein the reciprocal axes of the intake valves all intersect at a common line.

10. A combustion chamber configuration as set forth in claim 9 wherein the piston head is formed with recesses to clear the heads of the valves.

11. A combustion chamber configuration as set forth in claim 10 wherein the piston head is generally planar except for the recesses.

12. A combustion chamber configuration as set forth in claim 11 wherein the engine has a stroke-to-bore ratio of at most 0.8 to 1 and a compression ratio of at least 9 to 1.

* * * * *